(12) United States Patent
DiFrancesco et al.

(10) Patent No.: US 8,277,737 B2
(45) Date of Patent: *Oct. 2, 2012

(54) CATALYST SYSTEMS

(75) Inventors: Chris E. DiFrancesco, Durham, NC (US); James C. Altizer, Durham, NC (US); Thomas W. Hastings, Raleigh, NC (US); Edward F. Kassman, Chapel Hill, NC (US); Christian Trefzger, Durham, NC (US)

(73) Assignee: Cormetech, Inc., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/839,917

(22) Filed: Jul. 20, 2010

(65) Prior Publication Data

US 2010/0284877 A1 Nov. 11, 2010

Related U.S. Application Data

(63) Continuation of application No. 10/801,140, filed on Mar. 12, 2004, now Pat. No. 7,807,110.

(51) Int. Cl.
*B01D 50/00* (2006.01)

(52) U.S. Cl. .......................................... 422/180

(58) Field of Classification Search .................. 422/177, 422/180
See application file for complete search history.

(56) References Cited

U.S. PATENT DOCUMENTS

| | | | | |
|---|---|---|---|---|
| 4,223,660 A | * | 9/1980 | Lang | 126/190 |
| 4,673,658 A | * | 6/1987 | Gadkaree et al. | 501/89 |
| 4,840,827 A | * | 6/1989 | Mizutani et al. | 428/116 |
| 5,494,881 A | * | 2/1996 | Machida et al. | 502/439 |
| 6,375,450 B1 | * | 4/2002 | Golomb et al. | 425/199 |
| 6,696,131 B1 | * | 2/2004 | Nishimura et al. | 428/116 |

* cited by examiner

*Primary Examiner* — Tom Duong
(74) *Attorney, Agent, or Firm* — J. Clinton Wimbish; Smith Moore Leatherwood LLP

(57) ABSTRACT

The present invention provides monolithic structural catalysts. The catalysts have a thin wall structure and are advantageous for catalyzing reactions of gaseous fluid or liquid fluid molecules, such as the denitration or selective catalytic reduction (SCR) of nitrogen oxides ($NO_x$) in combustion flue gases. In an embodiment, the honeycomb-like monolithic structural body includes catalytically active outer peripheral walls and a plurality of catalytically active thin-walled inner partition walls, the thin-walled inner partition walls adapted to enhance fluid flow through the monolithic catalytic body and to increase interaction of the fluid molecules with the catalyst body.

23 Claims, 7 Drawing Sheets

(Measurement →←) 12 inner walls, 12 outer walls

CATALYST SYSTEMS

This application is a continuation application of U.S. patent application Ser. No. 10/801,140, filed Mar. 12, 2004, now U.S. Pat. No. 7,807,110.

FIELD OF THE INVENTION

The present invention relates generally to catalyst compositions. An embodiment of the present invention provides a thin-walled honeycomb-like monolithic structural catalyst.

BACKGROUND OF THE INVENTION

The high toxicity of nitrogen oxides and their role in the formation of acid rain and tropospheric ozone have resulted in the imposition of strict standards limiting the discharges of these chemical species. To meet these standards, it is generally necessary to remove at least part of these oxides present in the exhaust gases from stationary or mobile combustion sources Denitration or selective catalytic reduction (SCR) technology is commonly applied to combustion-derived gases for removal of nitrogen oxides. The denitration reaction comprises the reaction of nitrogen oxide species in the gases, such as nitric oxide (NO) or nitrogen dioxide ($NO_2$), with a nitrogen containing reductant, such as ammonia or urea, resulting in the production of nitrogen gas ($N_2$) and water.

It would be desirable to provide a monolithic structural catalyst body comprising an advanced thin-walled catalyst structure/composition that maintains an adequate strength for commercial or industrial use and demonstrates a superior utilization of catalyst activity within the thin-walled catalyst structure for the selective catalytic reduction of nitrogen oxides.

SUMMARY OF THE INVENTION

The present invention provides monolithic structural catalysts that provide advantages over heretofore utilized and suggested catalysts.

Catalyst bodies of the present invention may comprise an outer peripheral wall and a plurality of inner partition walls arranged within the outer peripheral wall. In an embodiment of the present invention an inner partition wall has a thickness less than 0.22 millimeters. As used herein with reference to the inner partition wall, thickness refers to the thickness upon formation of the catalyst body not including any additional catalytic material deposited thereon or increased or decreased thickness resulting from use for an intended purpose. The outer peripheral and inner partition walls may be formed from a chemical composition containing a catalytically active material. The formation of inner partition walls from a chemical composition containing catalyst material precludes the need to deposit catalyst material on catalytically inactive outer peripheral and inner partition walls as suggested in U.S. Pat. No. 5,494,881 to Machida et al. the disclosure of which is hereby incorporated herein by reference. In an embodiment of the present invention, however, the outer peripheral and inner partition walls are formed from a chemical composition containing catalytically active material and the walls further comprise deposited catalytically active material. In another embodiment, the deposited catalytically active material or materials may be deposited within portions of the catalytic structural body, such as end coatings. In another embodiment, the deposited catalytically active materials may be deposited in successive layers on the catalytic structural body. In still another embodiment, the deposited catalytically active materials may be different from each other and different from the catalytic material that comprises the outer peripheral and inner partition walls.

For use in industrial and commercial applications, it as advantageous that catalyst bodies of the present invention are of sufficient strength and durability to withstand high temperatures, typically between 300-400° C. in a range from 150-600° C., and structural support stress often in the form of compression resulting from sealing of the catalyst body within another structure.

A catalyst body of the present invention may be constructed with an outer peripheral wall that has a thickness greater than or equal to that of the inner partition walls. The increased thickness of the outer peripheral wall may assist in enhancing the overall mechanical strength of the catalyst body. The overall mechanical strengths and structural integrities of prior monolithic catalyst bodies have been limited by the inability to achieve a reduced inner wall thickness while maintaining adequate strength and porosity. The strength requirements for SCR catalyst bodies have often resulted in the underutilization of the entire catalytic activity potential of the catalyst compositions due to a combination of a minimum inner wall thickness necessary for mechanical strength coupled with resultant mass transport limitations for diffusion. As a result of these constraints, catalyst deep within the inner partition walls is not used as effectively or efficiently as catalyst near the surface of the inner partition walls. Embodiments of the present invention minimize these problems with heretofore known catalysts.

One feature and advantage of the present invention is that an embodiment of a catalyst body of the present invention may weigh less than heretofore known catalyst bodies while achieving similar amounts of selective catalytic reduction of nitrogen oxides.

Another feature and advantage of the present invention is that an embodiment of a catalyst body of the present invention weighing the same as heretofore known catalyst bodies will achieve greater levels of denitration or selective catalytic reduction of nitrogen oxides.

A further feature and advantage of the present invention is that an embodiment of a catalyst body of the present invention displays a catalyst having a lower thermal mass for reaching catalytic operating temperatures more quickly.

A still further feature and advantage of the present invention is that an embodiment of a catalyst body of the present invention demonstrates a reduced pressure drop sustained by the fluids caused to flow through the longitudinal flow channels, thereby reducing the energy expended for fluid flow through the catalyst body.

With the foregoing and other advantages and features of the invention that will become hereinafter apparent, the nature of the invention may be more clearly understood by reference to the following non-limiting detailed description of the invention and to the several views illustrated in the drawings.

DETAILED DESCRIPTION OF THE INVENTION

Figure 1:
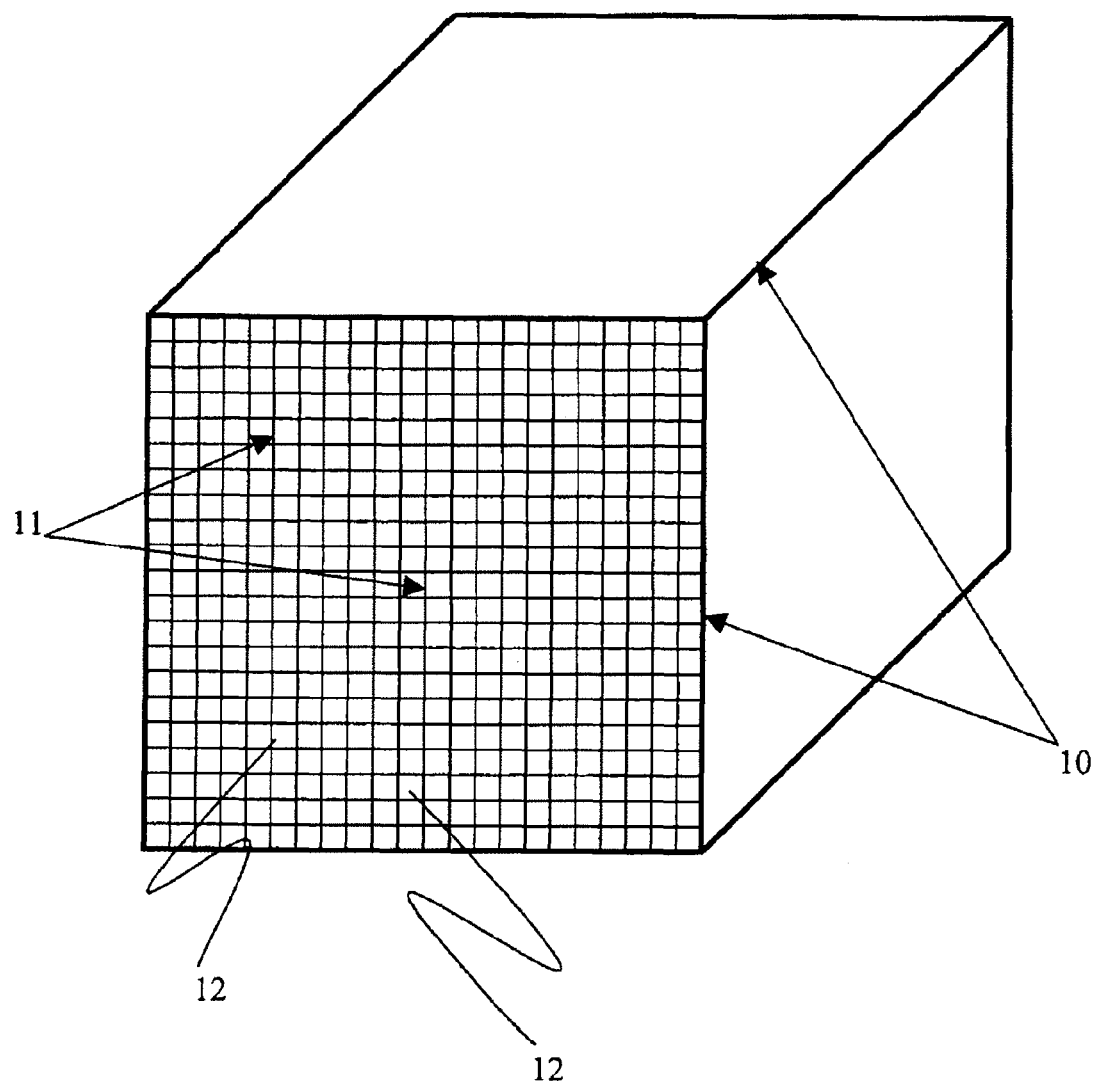
FIG. 1 illustrates a honeycomb-like monolithic structural catalyst body according to an embodiment of the present invention.

The present invention provides monolithic structural catalyst bodies comprising an advanced thin-walled catalyst structure and composition that can achieve adequate mechanical strength for commercial or industrial use while demonstrating a superior utilization of catalyst activity within the catalyst body. In an embodiment, the present invention provides a catalyst body comprising catalytically active thin-walled inner partition walls of uniform chemical composition. The catalyst body may be advantageously used for conducting catalytic reactions in a gaseous or liquid flow stream that is brought into contact with the active catalytic ingredients of the thin-walled structural catalyst body, such as the selective catalytic reduction of nitrogen oxides. Moreover, the present invention provides methods for the selective catalytic reduction of nitrogen oxides in a gas.

In an embodiment, the present invention provides a catalyst comprising an advanced thin-walled catalyst structure and composition that achieves a sufficient porosity and adequate mechanical strength for use in commercial and industrial applications. The present invention additionally provides methods for the selective catalytic reduction of nitrogen oxides present in combustion-derived flue gases or other gases containing nitrogen oxides such as in nitric acid manufacturing plants.

In an embodiment, the present invention provides catalyst bodies comprising catalytically active thin-walled inner partition walls of uniform chemical composition. The catalyst body of the present invention may be advantageously used for conducting catalytic reactions in a gaseous or liquid flow stream such as the selective catalytic reduction of nitrogen oxides.

In one aspect, the present invention provides a monolithic structural catalyst body comprising a uniform chemical composition comprising 50-99.9% by weight an inorganic oxide composition and at least 0.1% by weight a catalytically active metal functional group. In other embodiments the uniform chemical composition may comprise 70-95%, by weight, the inorganic oxide composition. In these or other embodiments the catalytically active metal functional group may comprise 1-30%, by weight of the structural catalyst body, typically 5-15%, by weight. The uniform chemical composition may further comprise fillers, reinforcement agents, and the like, as discussed herein. The inorganic oxide composition includes, but is not limited to, titania ($TiO_2$), alumina ($Al_2O_3$), zirconia ($ZrO_2$), and/or mixtures thereof. Moreover, the catalytically active metal functional group includes, but is not limited to, vanadium pentoxide ($V_2O_5$), tungsten oxide ($WO_3$), molybdenum oxide ($MoO_3$) and/or mixtures thereof.

The catalyst body may additionally comprise a catalytically active outer peripheral wall comprising the uniform chemical composition and a plurality of catalytically active inner partition walls comprising the uniform chemical composition. The inner partition walls are arranged within the outer peripheral wall and demonstrate a thickness of less than 0.22 mm. The inner partition walls define a plurality of flow channels, which extend longitudinally through the monolithic structural catalyst body. In addition, the monolithic structural catalyst body can have a macroporosity of greater than or equal to 0.05 cc/g in pores of diameter ranging from 600-5,000 Angstroms, a hydraulic diameter greater than or equal to 75 mm, and a transverse compressive strength of at least 1.5 kg/cm$^2$.

In another aspect, the present invention provides a method for the selective catalytic reduction of nitrogen oxides in a fluid comprising flowing the fluid through a catalyst body of the present invention, wherein the fluid can comprise a gas or liquid. In more detail, an embodiment of a method of the present invention comprises: flowing a fluid through a monolithic structural catalyst body comprising a uniform chemical composition comprising 50-99.9% by weight an inorganic oxide composition and at least 0.1% by weight a catalytically active metal functional group. The inorganic oxide support composition includes, but is not limited to, titania ($TiO_2$), alumina ($Al_2O_3$), zirconia ($ZrO_2$), and/or mixtures thereof. Moreover, the catalytically active metal functional group includes, but is not limited to, vanadium pentoxide ($V_2O_5$), tungsten oxide ($WO_3$), molybdenum oxide ($MoO_3$) and/or mixtures thereof. The catalyst body additionally comprises a catalytically active outer peripheral wall comprising the uniform chemical composition and a plurality of catalytically active inner partition walls comprising the uniform chemical composition. The inner partition walls are arranged within the outer peripheral wall and demonstrate a thickness of less than 0.22 mm. The inner partition walls define a plurality of flow channels, which extend longitudinally through the monolithic structural catalyst body. In addition, the monolithic structural catalyst body can have a macroporosity of greater than or equal to 0.05 cc/g in pores of diameter ranging from 600-5,000 Angstroms, a hydraulic diameter greater than or equal to 75 mm, and a transverse compressive strength of at least 1.5 kg/cm$^2$.

Reference is made below to specific embodiments of the present invention. Each embodiment is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment may be incorporated into another embodiment to yield a further embodiment. Thus, it is intended that the present invention cover such modifications and variations as come within the scope of the appended claims and their equivalents.

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary, depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g., 1 to 6.1, and ending with a maximum value of 10 or less, e.g., 5.5 to 10, as well as all ranges beginning and ending within the end points, e.g., 2 to 9, 3 to 8, 3 to 9, 4 to 7, and finally to each number 1, 2, 3, 4, 5, 6, 7, 8, 9 and 10 contained within the range. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

In an embodiment, a monolithic structural catalyst body of the present invention comprises an inner partition wall having an average thickness of less than 0.22 mm, the structural body having at least two of the following characteristics: a hydraulic diameter greater than or equal to 75 mm; a transverse compressive strength of at least 1.5 kg/cm$^2$; a macroporosity greater than or equal to 0.05 cc/g in pores of diameter ranging from 600 to 5,000 Angstroms; or a uniform chemical composition comprising 50-99.9% by weight an inorganic oxide composition and at least 0.1% by weight a catalytically active metal functional group.

In an embodiment, the monolithic structural catalyst of the present invention comprises an inner partition wall having an average thickness of less than 0.22 mm, wherein the monolithic structural catalyst body has a hydraulic diameter greater than or equal to 75 mm, and a transverse compressive strength of at least 1.5 kg/cm$^2$. The monolithic structural catalyst body of the present embodiment can additionally demonstrate a macroporosity of greater than or equal to 0.05 cc/g in pores of diameter ranging from 600 to 5,000 Angstroms. Moreover, the catalyst body can also comprise a uniform chemical composition comprising 50-99.9% by weight an inorganic oxide composition and at least 0.1% by weight a catalytically active metal functional group. The monolithic structural catalyst body of the present embodiment may further comprise a plurality of inner partition walls having an average thickness from 0.05 mm to 0.22 mm. The average thickness of the inner partition walls can additionally range from 0.05 mm to 0.20 mm and/or from 0.10 mm to 0.18 mm. Moreover, the hydraulic diameter of the monolithic structural catalyst of the present embodiment can be greater than or equal to 100 mm. The hydraulic diameter may additionally be greater than or equal to 150 mm. The transverse compressive strength of the monolithic structural catalyst body of the present embodiment can be greater than 3 kg/cm$^2$. The transverse compressive strength may also be greater than 4 kg/cm$^2$.

In another embodiment, the monolithic structural catalyst body of the present invention comprises an inner partition wall having a thickness of less than 0.22 mm and a uniform chemical composition comprising 50-99.9% by weight an inorganic oxide composition and at least 0.1% by weight a catalytically active metal functional group wherein the monolithic structural catalyst body has a macroporosity greater than or equal to 0.05 cc/g in pores of diameter ranging from 600 to 5,000 Angstroms. The monolithic structural catalyst body can additionally comprise a hydraulic diameter greater than or equal to 75 mm. The hydraulic diameter of the catalyst body can also be greater than or equal to 100 mm and/or greater than or equal to 150 mm. The monolithic structural catalyst body can further demonstrate a transverse compressive strength of at least 1.5 kg/cm$^2$. The catalyst body can additionally have a transverse compressive strength greater than 3 kg/cm$^2$ and/or greater than 4 kg/cm$^2$. The monolithic structural catalyst body of the present embodiment further comprises a plurality of inner partition walls having an average thickness from 0.05 mm to 0.22 mm. The average thickness of the inner partition walls can additionally range from 0.05 mm to 0.20 mm and/or from 0.10 mm to 0.18 mm.

In another embodiment, the monolithic structural catalyst of the present invention comprises an inner partition wall having an average thickness of less than 0.22 mm wherein the monolithic structural catalyst has a hydraulic diameter greater than or equal to 75 mm and a macroporosity greater than or equal to 0.05 cc/g in pores of diameter ranging from 600 to 5,000 Angstroms. The hydraulic diameter of the catalyst body can additionally be greater than or equal to 100 mm and/or greater than or equal to 150 mm. The monolithic structural catalyst body of the present embodiment comprises a plurality of inner partition walls having an average thickness from 0.05 mm to 0.22 mm. The average thickness of the inner partition walls can additionally range from 0.05 mm to 0.20 mm and/or from 0.10 mm to 0.18 mm.

In another embodiment, the monolithic structural catalyst body of the present invention comprises an inner partition wall having an average thickness of less than 0.22 mm and a uniform chemical composition comprising 50-99.9% by weight an inorganic oxide composition and at least 0.1% by weight a catalytically active metal functional group, wherein the monolithic structural catalyst body has a hydraulic diameter greater than or equal to 75 mm. The hydraulic diameter of the catalyst body can additionally be greater than or equal to 100 mm and/or greater than or equal to 150 mm. The monolithic structural catalyst body can display a transverse compressive strength of at least 1.5 kg/cm$^2$. The catalyst body can also have a transverse compressive strength of greater than 3 kg/cm$^2$ and/or greater than 4 kg/cm$^2$. The monolithic structural catalyst body of the present embodiment further comprises a plurality of inner partition walls having an average thickness from 0.05 mm to 0.22 mm. The average thickness of the inner partition walls can additionally range from 0.05 mm to 0.20 mm and/or from 0.10 mm to 0.18 mm.

In another embodiment, the monolithic structural catalyst body of the present invention comprises an inner partition wall having an average thickness of less than 0.22 mm and a uniform chemical composition comprising 50-99.9% by weight an inorganic oxide composition and at least 0.1% by weight a catalytically active metal functional group, wherein the monolithic structural catalyst body has a transverse compressive strength of at least 1.5 kg/cm$^2$. The catalyst body can additionally demonstrate a transverse compressive strength greater than 3 kg/cm$^2$ and/or greater than 4 kg/cm$^2$. The monolithic structural catalyst body of the present embodiment further comprises a plurality of inner partition walls having an average thickness from 0.05 to 0.22 mm. The average thickness of the inner partition wall can additionally range from 0.05 mm to 0.20 mm and/or from 0.10 mm to 0.18 mm.

In another embodiment, the monolithic structural catalyst of the present invention comprises an inner partition wall having an average thickness of less than 0.22 mm wherein the monolithic structural catalyst body has a transverse compressive strength of at least 1.5 kg/cm and a macroporosity of greater than or equal to 0.05 cc/g in pores of diameter ranging from 600 to 5,000 Angstroms. The monolithic structural catalyst body can additionally display a transverse compressive strength greater than 3 kg/cm² and/or greater than 4 kg/cm². The monolithic structural catalyst body of the present embodiment further comprises a plurality of inner partition walls having an average thickness from 0.05 mm to 0.22 mm. The average thickness of the inner partition walls can additionally range form 0.05 mm to 0.20 mm and/or from 0.10 mm to 0.18 mm.

As explained herein, further embodiments of any of the foregoing monolithic structural catalyst bodies may further comprise additional deposited catalytic material. In an embodiment, the monolithic structural catalyst body of the present invention comprises an inner partition wall having an average thickness of less than 0.22 mm and additional catalytic material deposited on the inner partition wall, wherein the monolithic structural catalyst body has at least two of the following characteristics: a hydraulic diameter greater than or equal to 75 mm; a transverse compressive strength of at least 1.5 kg/cm²; a macroporosity greater than or equal to 0.05 cc/g in pores of diameter ranging from 600 to 5,000 Angstroms; or a uniform chemical composition comprising 50-99.9% by weight an inorganic oxide composition and at least 0.1% by weight a catalytically active metal functional group. The inner partition wall thickness of the monolithic structural catalyst body may be increased, for example, by the deposition of catalytically active material.

In an embodiment of the present invention, a monolithic structural catalyst body comprises a uniform chemical composition; a catalytically active outer peripheral wall comprising the uniform chemical composition; a plurality of catalytically active inner partition walls comprising the uniform chemical composition, the inner partition walls being arranged inside the outer peripheral wall; and a plurality of flow channels defined by the inner partition walls, the flow channels extending longitudinally through the monolithic structural catalyst body wherein the monolithic structural catalyst body demonstrates a macroporosity, pore diameter, hydraulic diameter, and transverse compressive strength.

Referring now to the figures wherein like numerals indicate like elements throughout the several figures, FIG. 1 illustrates a honeycomb-like monolithic structural catalyst body according to an embodiment of the present invention. The honeycomb-like monolithic structural catalyst of FIG. 1 displays a catalytically active outer peripheral wall 10 and a plurality of catalytically active inner partition walls 11. The inner partition walls 11 define a plurality of flow channels or cells 12 which extend longitudinally through the honeycomb-like monolithic structural catalyst body.

In one embodiment of the present invention, the monolithic structural catalyst body can comprise a uniform chemical composition comprising 50-99.9% by weight an inorganic oxide composition and at least 0.1% by weight a catalytically active metal functional group. The inorganic oxide composition includes, but is not limited to, titania ($TiO_2$), alumina ($Al_2O_3$), zirconia ($ZrO_2$), and/or mixtures thereof. Moreover, the catalytically active metal functional group includes, but is not limited to, vanadium pentoxide ($V_2O_5$), tungsten oxide ($WO_3$), molybdenum oxide ($MoO_3$) and/or mixtures thereof. In further embodiments, the uniform chemical composition can comprise up to 30% by weight other oxides such as silicon dioxide ($SiO_2$), reinforcement agents such as glass fibers, and/or extrusion aids.

In some embodiments of the present invention, the plurality of catalytically active inner partition walls comprising the uniform chemical composition can demonstrate an average thickness of less than 0.22 mm. In other embodiments, the inner partition walls can display an average thickness ranging from 0.05 mm to 0.22 mm. In further embodiments, the inner partition walls can have an average thickness ranging from 0.05 mm to 0.20 mm. In still further embodiments, the inner partition walls can have an average thickness of 0.10 mm to 0.18 mm. Moreover, the catalytically active outer peripheral wall comprising the uniform chemical composition in embodiments of the present invention can have an average thickness of at least the average thickness of the inner partition walls.

In other embodiments of the present invention, the plurality of catalytically active inner partition walls and outer peripheral wall comprising the uniform chemical composition can be deposited with additional catalytic material to provide multi-functional catalysis or enhanced surface reactivity, by using one or more additional deposition or treatment steps on the green or fired catalytic structural body. Additional catalytic material can include, but is not limited to, platinum group metals, gold, silver, iridium, cerium, other noble metals and/or mixtures thereof. The depositing of additional catalytic material in or on the inner partition walls can be accomplished by aqueous impregnation, dip coating, washcoating, chemical vapor deposition, spraying of droplets, or other suitable techniques including any surface pre-treatment or post-treatments needed such as treatment with acid solution or thermal post-treatment. In some embodiments, the catalytically active inner partition walls comprising the uniform chemical composition can demonstrate an average thickness of less than 0.22 mm prior to depositing additional catalytic material. In other embodiments the inner partition walls comprising the uniform chemical composition can have an average thickness ranging from 0.05 mm to 0.22 mm prior to depositing additional catalytic material. In further embodiments, the inner partition walls comprising the uniform chemical composition can have an average thickness ranging from 0.05 to 0.20 mm prior to depositing additional catalytic material. In still further embodiments, the inner partition walls comprising the uniform chemical composition can have an average thickness of 0.10 mm to 0.18 mm prior to depositing additional catalytic material. Moreover, in embodiments of the present invention, the catalytically active outer peripheral wall comprising the uniform chemical composition can be deposited with additional catalytic material. In such embodiments, the outer peripheral wall can have an average thickness prior to deposition of at least the average thickness of the inner partition walls comprising the uniform chemical composition prior to deposition.

Figure 2:
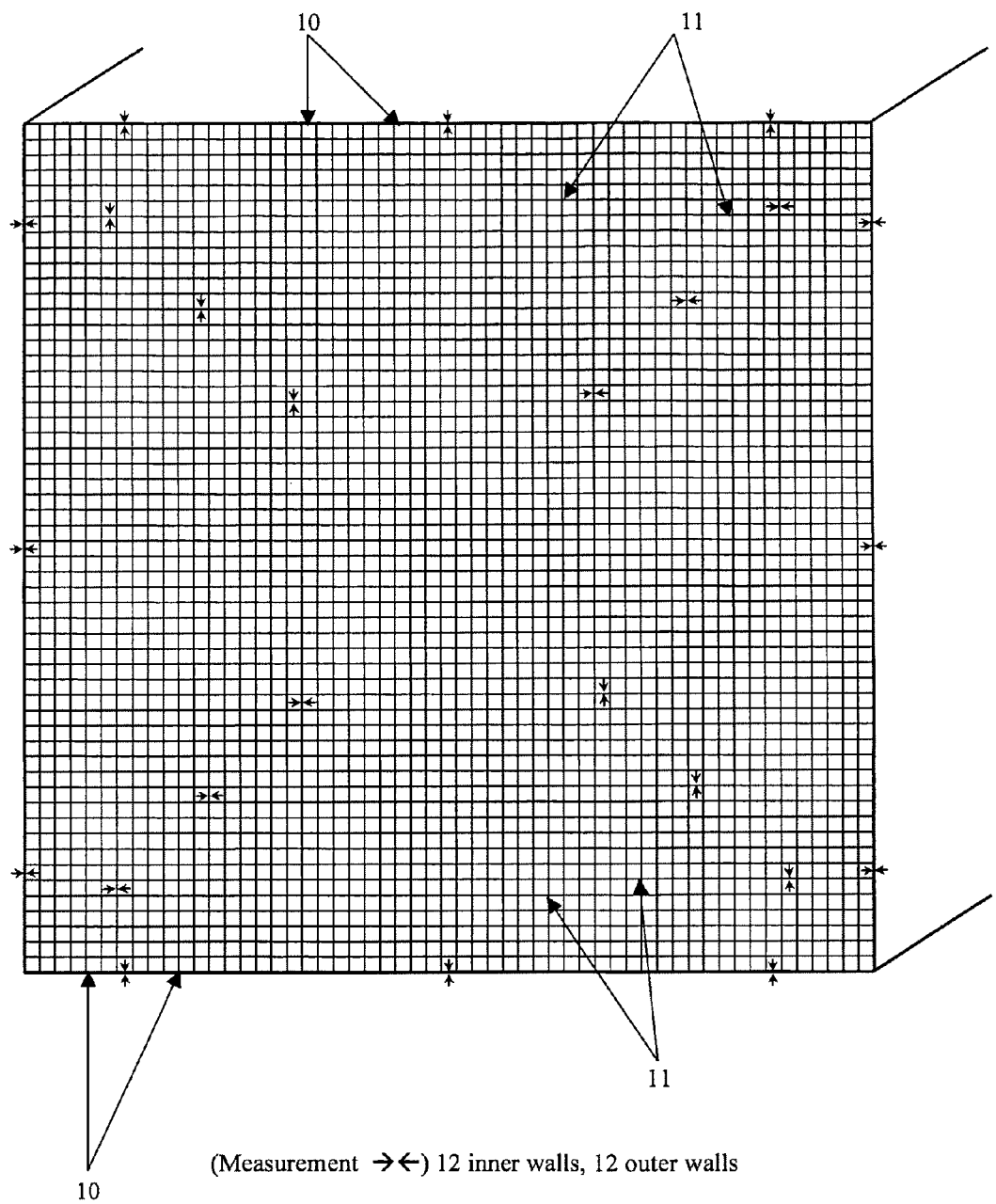
FIG. 2 illustrates a method according to an embodiment of the present invention.

The thickness of the outer peripheral wall and inner partition walls are determined with a caliper or micrometer with a resolution of 0.01 mm. FIG. 2 illustrates a method of determining the average thickness of the outer peripheral wall 10 and inner partition walls 11. The thickness of the outer peripheral wall 10 is measured in twelve (12) different locations on the catalyst body sample. The twelve measuring locations comprise three points on each side of the square outer peripheral wall as demonstrated in FIG. 2. The average thickness of the outer peripheral wall 10 is calculated by averaging the values obtained from the twelve (12) measurements. Similarly, the average thickness of the inner partition walls 11 is determined by initially measuring the thickness of the inner partition walls 11 at twelve (12) different locations throughout the catalyst body. The inner partition walls 11 are measured in the horizontal and vertical directions as displayed in FIG. 2. The average thickness of the inner partition walls 11 is calculated by averaging the values obtained in the twelve measurements.

Figure 3:
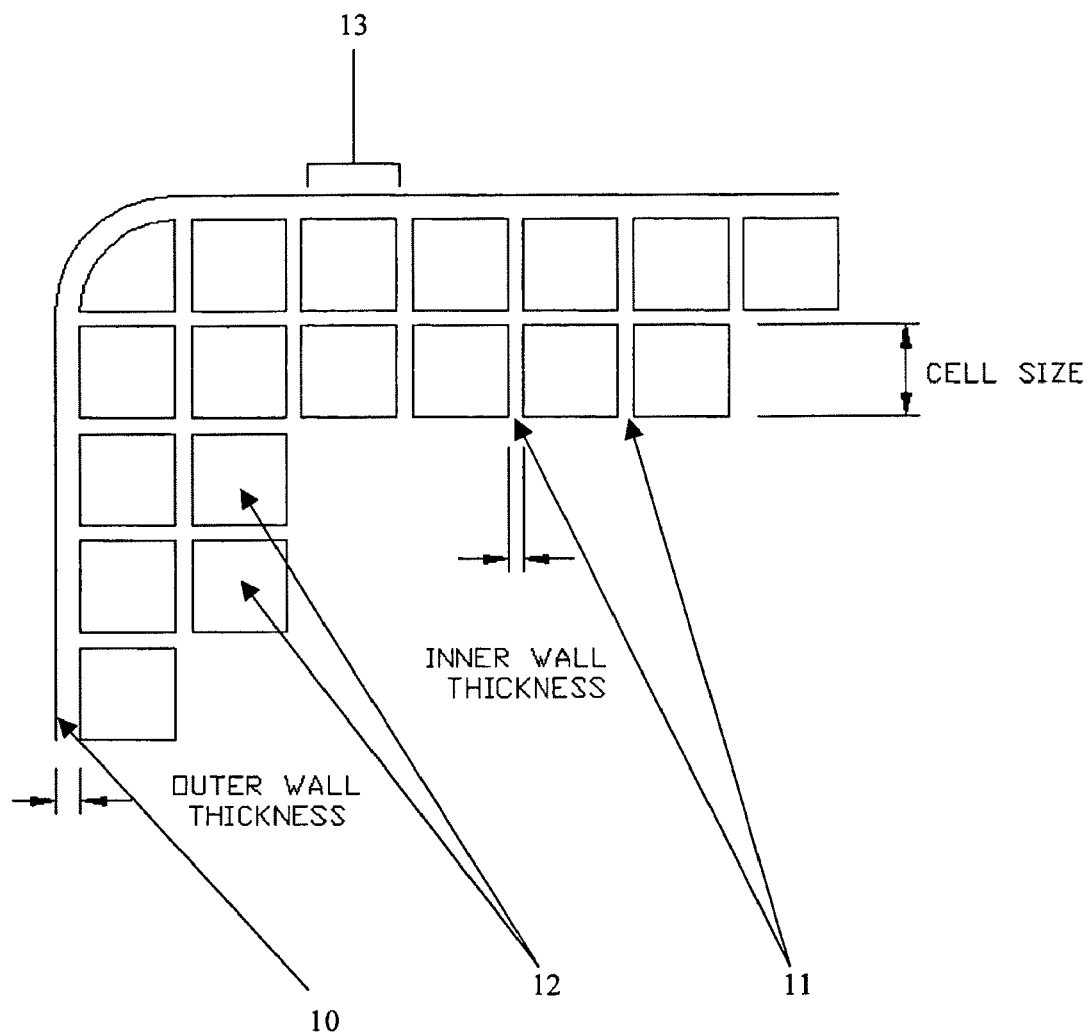
FIG. 3 illustrates a honeycomb-like monolithic structural catalyst body according to an embodiment of the present invention.

In an embodiment of the present invention, the monolithic structural catalyst body comprises a plurality of flow channels defined by the inner partition walls, the flow channels extending longitudinally through the honeycomb-like catalyst body. FIG. 3 illustrates flow channels 12 defined by the inner partition walls 11 in a honeycomb-like monolithic structural catalyst body according to an embodiment of the present invention. The inner partition walls 11 and their junctures with the outer peripheral wall serve as boundaries for adjacent flow channels 12. When a portion of the outer peripheral wall 10 serves as a boundary for a flow channel 12, that portion may be referred to as an outer peripheral wall segment 13. Outer peripheral wall segments 13 are important in determining the total wall count for a monolithic catalyst body in embodiments of the present invention. In some embodiments, the axial length in the direction of flow can be 150 mm in length. In other embodiments, the axial dimension of a flow channel can vary depending on the preferred application of the catalyst body. The outside of the outer peripheral wall bounds the overall cross-sectional size dimension and overall geometrical cross-sectional shape of the structural catalytic body.

In an embodiment of the present invention, the monolithic structural catalyst body can have an average cross-sectional size dimension characterized by a hydraulic diameter of greater than or equal to about 75 mm. In other embodiments the catalyst body can have a hydraulic diameter of greater than or equal to about 100 mm. In still further embodiments, the catalyst body can have a hydraulic diameter of greater than or equal to 150 mm. The hydraulic diameter of the catalyst body is defined as being equal to the cross-sectional area perpendicular to the direction of flow of the catalyst body multiplied by four and divided by the value of the outer perimeter of the outer peripheral wall. When the monolithic structural catalyst body displays a circular cross-sectional geometry, the hydraulic diameter is equal to the diameter of the circular cross-sectional area. In the case of a square cross-sectional geometry, the hydraulic diameter is equal to the length or width of a side.

In an embodiment of the present invention, the cross-sectional profile of the flow channels can be nominally polygonal such as triangular, square, rectangular, or hexagonal. In another embodiment of the present invention, the cross-sectional profile of the flow channels can be corrugated, round, oval, or combinations with polygonal and curved shapes such as annular sectors. In some embodiments, the cross-sectional profile of the outer peripheral wall of the catalyst body can be square, rectangular, round, oval, circular sectors such as pie slices or quadrants, or any other geometric shape or shapes convenient for a given application.

In an embodiment of the present invention, the uniform chemical composition, catalytically active outer peripheral and inner partition walls can comprise the thin-walled catalyst structure of the monolithic structural catalyst body that enables catalytic reactions with fluids flowing through the flow channels of the catalyst body.

The thin-walled catalyst structure of the monolithic structural catalyst body of the present invention can provide several advantages not present in prior monolithic catalyst bodies. For example, in an embodiment of the present invention, the thin-walled catalyst structure can facilitate the use of less catalyst weight to achieve the same amount of catalytic activity, for example the reduction of nitrogen oxides. Catalyst bodies with thicker inner partition walls suffer from mass transport limitations wherein, for example, reactants do not always substantially reach the catalyst composition deep within the inner partition walls, leading to an ineffective use of catalyst. The thin-walled catalyst structure of the present invention can reduce mass transport limitations associated with counter-diffusing reactants and products within the catalyst walls wherein catalytic reaction takes place on catalytically active sites contained therein, as well as reducing the overall effects of combined boundary layer or external mass transfer in conjunction with internal mass transfer and reaction within the walls. The reduction in mass transport limitations allows for the use of less catalyst in achieving the same or similar amounts of catalytic reaction as demonstrated by catalytic bodies with thicker inner partition walls.

Advantages in catalyst body weight reduction may be realized in reducing the amount of weight that must be supported. The reduction in weight may reduce the amount and expense of the support structure for the catalysts including the amount of steel required for catalyst support assemblies in certain applications as well as the amount of space. Reducing catalyst body weight may advantageously decrease the size and weight of the ductwork support framework and foundation materials required for stationary applications, especially electric power generation applications, at a commercial or industrial installation. Moreover, in retrofit applications where the thin-walled catalyst structure of the present invention is displacing a prior catalyst body, the weight reduction can additionally result in reduced mechanical stress on the existing support structure.

In addition to reducing the weight of the monolithic structural catalyst body, the thin-walled catalyst structure can reduce catalyst body production costs. The ability to achieve the same or similar amounts of catalytic activity with less catalyst material reduces the amount of catalyst material that must be purchased in constructing catalyst bodies of the present invention.

The thin-walled catalyst structure in an embodiment of the present invention can additionally provide a catalyst with a lower thermal mass (the product of heat capacity and catalyst weight), which, along with thinner walls, allows the catalyst to achieve operating temperatures more quickly. In achieving operating temperatures more quickly, the catalyst can reduce start-up emissions. Moreover, the lower thermal mass of the catalyst can produce quicker responses to transient changes in operating conditions.

Further, in an embodiment of the present invention the thin-walled catalyst structure can reduce the pressure drop sustained by fluid flow through the monolithic structural catalyst body. The thin-walled catalyst structure can increase the open frontal area of the monolithic structural catalyst body, the open frontal area being that portion of the cross-section available for flow on a cross-sectional surface perpendicular to the direction of flow. An increased frontal area can result in more efficient fluid flow characteristics within the catalyst body, which can decrease the pressure drop sustained by fluids passing through the catalyst body. The reduction in pressure drop is advantageous in many applications. For example, in electrical power generation, a reduction in pressure drop decreases parasitic power losses.

The pressure drop sustained by gases passing through the flow channels of the catalyst body sample can be measured with a slant-tube vacuum monometer across the total length of the sample under a controlled temperature, gas flow rate, and gas composition. Similar techniques may be utilized for other fluids.

Figure 4:
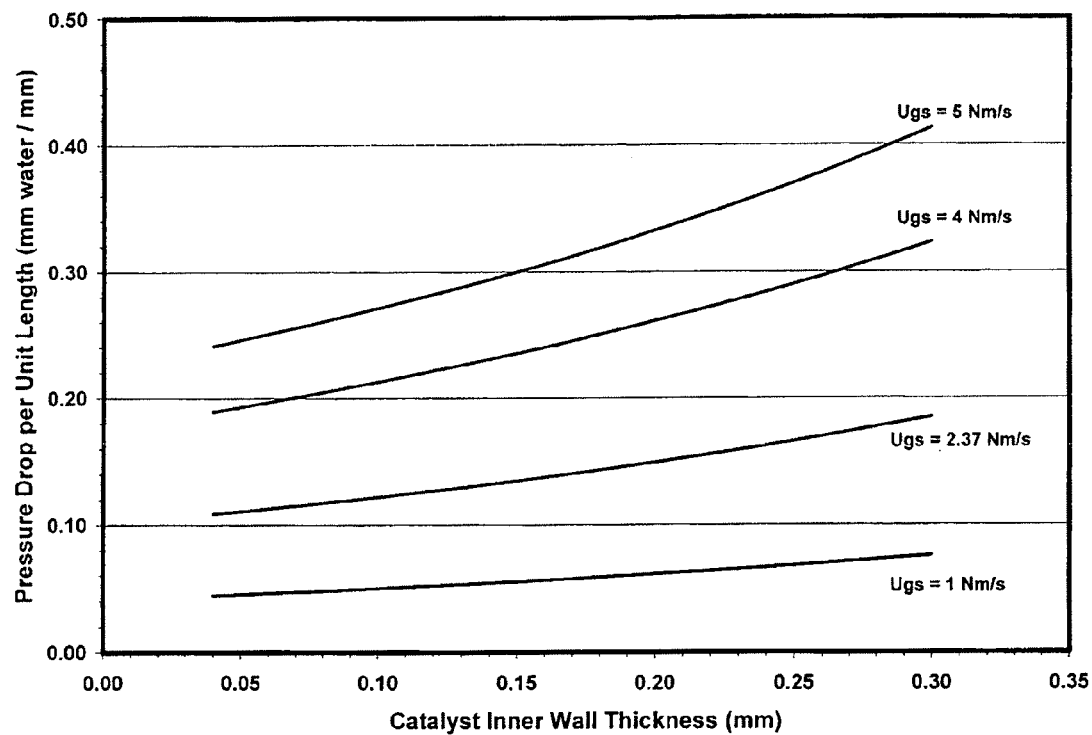
FIG. 4 illustrates the dependency of fluid pressure drop on the inner wall thickness of a catalyst body.

FIG. 4 illustrates theoretical curves for pressure drop per unit length of monolithic catalyst versus inner wall thickness at various superficial gas velocity, $U_{gs}$, being corrected to normal conditions of 1 atmosphere pressure and a temperature of 0° C. The experimental parameters used for generating the curves were a catalyst pitch (cell size plus inner wall thickness as shown in FIG. 3) of 2.15 mm, a temperature of 315° C., and a gas composition comprising 16.5% $O_2$ (dry), 5.4% water vapor, 2.4% $CO_2$ (dry), and balance $N_2$. As displayed in FIG. 4, the pressure drop per unit length sustained by the flowing gases decreased with decreasing catalyst inner wall thickness substantially independent of the gas flow rate expressed in Nm/s.

In some embodiments of the present invention, the monolithic structural catalyst body can have a macroporosity of greater than or equal to 0.05 cc/g in pores of diameter ranging from 600-5,000 Angstroms. In other embodiments, the monolithic structural catalyst body can have a macroporosity greater than 0.09 cc/g in pores of diameter ranging from 600-5,000 Angstroms. In further embodiments, the catalyst body can have a macroporosity ranging from 0.05 cc/g to 0.35 cc/g in pores of diameter ranging from 600-5,000 Angstroms. Similarly, in another embodiment, the catalyst body can have a porosity of at least 0.24 cc/g.

The macroporosities of a catalyst body in an embodiment of the present invention may be determined from analysis of the appropriate pore size ranges of the catalyst body pore size distributions. Pore size distributions and porosities or total pore volumes in embodiments of the present invention may be measured according to ASTM Method UOP578-02 "Automated Pore Volume and Pore Size Distribution of Porous Substances by Mercury Porosimetry," wherein sample preparation for measurements include an oven pre-treatment at 300° C. for one (1) hour as opposed to the vacuum oven pretreatment at 150° C. for eight (8) hours as called for by the ASTM procedure. The remaining steps in the ASTM procedure may be followed without alteration.

In an embodiment of the present invention, the monolithic structural catalyst body can have a transverse compressive strength greater than 3 kg/cm². In other embodiments of the present invention, the monolithic structural catalyst body can display a transverse compressive strength greater than 4 kg/cm².

The transverse compressive strengths of the monolithic structural catalyst bodies of the present invention may be measured with a compressive testing apparatus such as Tinius Olson 60,000 lb. Super "L" Compression Testing Machine that displays a maximum compression load of 30,000 kg and can be obtained from Tinius Olsen of Willow Grove, Pa. Samples for transverse compressive strength testing may be prepared by cutting a monolithic structural catalyst into sections typically of 150 mm in length, but at least 50 mm in length, wherein each section can serve as an individual test sample.

Ceramic wool of 6 mm thickness may be spread under and over the pressure surface of the sample, and the wrapped sample set in a vinyl bag in the center of the pressure plates. The pressure plates used in the testing may be stainless steel with dimensions of 160 mm×160 mm. Transverse compression strength is quantified with the side surface on the bottom with the compressive load applied in the direction parallel to the cross-section of the honeycomb structure and perpendicular to the partition walls. The compressive load is thus applied in the direction perpendicular to the direction of flow in the flow channels. The compressive load can be applied as delineated in Table 1.

TABLE 1

| Compressive Loads | |
|---|---|
| FULL SCALE LOAD | COMPRESSION SPEED |
| 3,000 kg | 25 kg/s |
| 6,000 kg | 50 kg/s |
| 15,000 kg | 125 kg/s |

The maximum transverse compressive load W (kg) withstood by the samples is registered by the apparatus. The transverse compressive strength is subsequently calculated from the maximum compressive load in kilograms-force ($kg_f$) by dividing the value of the maximum compressive load by the surface area over which the load was applied.

In an embodiment of the present invention where the catalyst body does not lie flat, such as when the catalyst body has an overall circular or oval cross-sectional geometry, a subsection of the catalyst body is cut from the overall sample for testing. The subsection is cut so as to produce a sample with upper and lower flat surfaces. The remainder of the strength testing proceeds in a manner consistent with that previously described.

Another advantage of an embodiment of the present invention relates to the minimization of defects within the structure of the inner partition walls. Defects comprise discontinuities in the structure of the inner partition walls. For example, a missing juncture between several inner partition walls at the cross-sectional face being examined is a discontinuity for each of the several inner partition walls for the purposes of defect analysis in embodiments of the present invention. Another example of a defect is a single discontinuity in a single inner partition wall or outer peripheral wall segment at the cross-sectional face being examined.

A defect analysis may be conducted by visually observing and counting the number of inner partition walls and outer peripheral wall segments with discontinuities at the location of a single cleanly-cut cross-sectional face of a sample and expressed as a percentage of the total number of walls within the sample.

In some embodiments of the present invention, the monolithic structural catalyst body can display a defect level of 2% or less. In other embodiments, the monolithic structural catalyst body can have a defect level of 0.3% or less.

A monolithic structural catalyst body of the present invention may be produced by mixing up to 50-99.9% by weight an inorganic oxide composition, or a precursor which yields an inorganic oxide composition and at least 0.1% by weight a catalytically active metal functional group, or a precursor which yields a catalytically active metal functional group. The inorganic oxide composition includes, but is not limited to, titania ($TiO_2$), alumina ($Al_2O_3$), zirconia ($ZrO_2$), and/or mixtures thereof. Moreover, the catalytic metal functional group includes, but is not limited to, vanadium pentoxide ($V_2O_5$), tungsten oxide ($WO_3$), molybdenum oxide ($MoO_3$) and/or mixtures thereof. The resulting catalytic mixture can be kneaded into a clay-like substance and subsequently extruded from an extrusion molding machine to form a honeycomb-like monolithic catalyst structure comprising the outer partition wall, inner partition walls and longitudinal flow channels.

In some embodiments, when the monolithic structural catalyst body is extruded, the extrusion formulation can comprise any number of peptizing agents, binding agents, extrusion aids, lubricants, plasticizers, reinforcement agents, and the like to assist in the extrusion process and/or generate the desired structural and pore properties for an intended application. Examples of materials that may be included in an extrusion formula include, but are not limited to, glass fibers or strands, silicon carbide fibers, inorganic acids (e.g. phosphoric acid, nitric acid, etc.) organic acids (e.g. acetic acid, citric acid, formic acid, etc.), salts of organic acids (e.g. ammonium formate, ammonium acetate, ammonium citrate, etc.) cellulose compounds, starches, polyethylene oxide, stearic alcohols, alcohols, graphite, stearic acid, amines, oils, fats, and polymers. The extruded product may subsequently be dried or thermally treated. Moreover, in some embodiments, the extruded product may be subsequently deposited as explained herein with additional catalyst material such as a platinum group metal or other noble metal.

A monolithic structural catalyst body of the present invention may be produced by methods generally used in the art, including extruding, molding and the like. The starting material for extruding may be generally produced by admixing the chemical compositions utilized in the catalyst body. As described herein, the chemical compositions may comprise inorganic oxides, including inorganic oxides or other metals with catalytic functionality. To the extent utilized, fillers, binders, extrusion aids, lubricants, reinforcing agents, and the like, may also be admixed with the chemical compositions. The resulting catalytic mixture can be mixed with water, kneaded into a paste that is form-stable up to the yield point of the material, and subsequently extruded from an extrusion molding machine to form a form-stable honeycomb-like monolithic catalyst structure comprising the outer partition wall, inner partition walls and longitudinal flow channels. The extrusion system may include extruder machines, a filter or screen, and an extrusion die. The filter or screen may be utilized to facilitate passage of the mixture through the die, for example to reduce clogging of the die, without removing filler, binders, and reinforcement aids that provide advantageous product properties. The extruded product may subsequently be dried or thermally treated.

It is generally desirable, when extruding embodiments of the present invention to use sufficient energy to achieving intimate mixing of the compositional ingredients while minimizing additional energy that may have an adverse impact on particle packing characteristics that provide advantageous product properties.

Additional energy is utilized in the mixing equipment to increase form-stability, and in the extrusion system to move the extrusion mixture through the extruder machines, filter or screen and die. As set forth above, lubricants and extrusion aids may be utilized in the starting composition for the catalyst body to minimize this additional energy. Other means of reducing additional energy known in the art, include maximizing mixer and extruder efficiency and minimizing wall friction in the screen and die.

In another aspect, the present invention provides methods for catalyzing reactions in a fluid comprising contacting the fluid with a catalyst body of the present invention.

An embodiment of a method of the present invention for reducing the nitrogen oxide content of a fluid comprises contacting the fluid with, for example by flowing the fluid through, a monolithic structural catalyst body of the present invention comprising a chemical composition suitable for the selective catalytic reduction of nitrogen oxides. In an embodiment of the present invention, a method for reducing the nitrogen oxide content of a fluid can comprise flowing the fluid through a monolithic structural catalyst body comprising an inner partition wall having an average thickness of less than 0.22 mm, the structural body having at least two of the following characteristics: a hydraulic diameter greater than or equal to 75 mm; a transverse compressive strength of at least 1.5 kg/cm$^2$; a macroporosity greater than or equal to 0.05 cc/g in pores of diameter ranging from 600 to 5,000 Angstroms; or a uniform chemical composition comprising 50-99.9% by weight an inorganic oxide composition and at least 0.1% by weight a catalytically active functional group.

In another embodiment, a method for reducing the nitrogen dioxide content of a fluid comprises flowing the fluid through a monolithic structural catalyst body comprising an inner partition wall having an average thickness of less than 0.22 mm, wherein the monolithic structural catalyst body has a hydraulic diameter greater than or equal to 75 mm and a transverse compressive strength of at least 1.5 kg/cm$^2$.

In another embodiment, a method for reducing the nitrogen dioxide content of a fluid comprises flowing the fluid through a monolithic structural catalyst body comprising an inner partition wall having an average thickness of less than 0.22 mm and a uniform chemical composition comprising 50-99.9% by weight an inorganic oxide composition and at least 0.1% by weight a catalytically active metal functional group, wherein the monolithic structural catalyst body has a macroporosity greater than or equal to 0.05 cc/g in pores of diameter ranging from 600 to 5,000 Angstroms.

In another embodiment, a method for reducing the nitrogen dioxide content of a fluid comprises flowing the fluid through a monolithic structural catalyst body comprising an inner partition wall having an average thickness of less than 0.22 mm, wherein the monolithic structural catalyst body has a hydraulic diameter greater than or equal to 75 mm and a macroporosity greater than or equal to 0.05 cc/g in pores of diameter ranging from 600 to 5,000 Angstroms.

In another embodiment, a method for reducing the nitrogen dioxide content of a fluid comprises flowing the fluid through a monolithic structural catalyst body comprising an inner partition wall having an average thickness of less than 0.22 mm and a uniform chemical composition comprising 50-99.9% by weight an inorganic oxide composition and at least 0.1% by weight a catalytically active metal functional group, wherein the monolithic structural catalyst body has a hydraulic diameter greater than or equal to 75 mm.

In another embodiment, a method for reducing the nitrogen dioxide content of a fluid comprises flowing the fluid through a monolithic structural catalyst body comprising an inner partition wall having an average thickness of less than 0.22 mm and a uniform chemical composition comprising 50-99.9% by weight an inorganic oxide composition and at least 0.1% by weight a catalytically active metal functional group, wherein the monolithic structural catalyst body has a transverse compressive strength of at least 1.5 kg/cm$^2$.

In another embodiment, a method for reducing the nitrogen dioxide content of a fluid comprises flowing the fluid through a monolithic structural catalyst body comprising an inner partition wall having an average thickness of less than 0.22 mm, wherein the monolithic structural catalyst body has a transverse compressive strength of at least 1.5 kg/cm and a macroporosity of greater than or equal to 0.05 cc/g in pores of diameter ranging from 600 to 5,000 Angstroms.

In another embodiment, a method for reducing the nitrogen dioxide content of a fluid comprises flowing the fluid through a monolithic structural catalyst body comprising an inner partition wall having an average thickness of less than 0.22 mm and additional catalytic material deposited in and/or on the inner partition wall, wherein the monolithic structural catalyst body has at least two of the following characteristics: a hydraulic diameter greater than or equal to 75 mm; a transverse compressive strength of at least 1.5 kg/cm$^2$; a macroporosity greater than or equal to 0.05 cc/g in pores of diameter ranging from 600 to 5,000 Angstroms; or a uniform chemical composition comprising 50-99.9% by weight an inorganic oxide composition and at least 0.1% by weight a catalytically active functional group.

In some embodiments of a method of reducing the nitrogen oxide content of a fluid, the fluid can comprise combustion-flue gases or any other gas containing nitrogen oxides. Moreover, in another embodiment, the temperature of the gas flowing through the honeycomb-like monolithic structural catalyst body can range from about 150° C. to about 600° C.

Similar techniques may be utilized for catalyzing multiple reactions in combustion-flue gases or reactions in other fluids.

The embodiments described above in addition to other embodiments can be further understood with reference to the following examples. The tests used and reported on in the following Examples were as described above.

Example 1

Prior Art

Example 1 describes a prior art honeycomb-like monolithic structural catalyst body. This example is provided to set forth a basis of comparison for the following examples of embodiments of the present invention.

The honeycomb-like monolithic structural catalyst body of Example 1 was produced by a generally utilized extrusion technique. The compositional parameters and physical properties of the catalytic body are summarized in Table 2. The catalytic body displayed a catalyst composition comprising 75.6% titania ($TiO_2$), 8.9% tungsten trioxide ($WO_3$), 3.4% vanadium pentoxide ($V_2O_5$), and 12.1% other components comprising $SiO_2$, CaO, $Al_2O_3$, $Fe_2O_3$, $SO_4$, and minor species.

The thickness of the inner partition walls of the catalyst body was 0.27 mm while the thickness of the outer peripheral wall was 0.65 mm, the walls being measured in accordance with the twelve (12) point method previously described. The flow channels enclosed by the inner partition walls and outer peripheral wall were nominally square in cross-sectional profile. The outer perimeter of the outer periphery was nominally square in cross-sectional profile with a hydraulic diameter of 150 mm.

The honeycomb-like monolithic structural catalyst so prepared consisted of a total of 4,900 cells comprising longitudinal flow channels and a total of 9,940 walls comprising the inner partition walls and outer peripheral wall segments.

The transverse compressive strength of the catalyst body of Example 1 was measured according to the method previously discussed. The catalyst body displayed a transverse compressive strength of 5.8 kg/cm$^2$. The porosity and macroporosity of catalyst body were determined in a manner consistent with the ASTM mercury intrusion porosimetry procedure previously described for calculating these parameters. The porosity was measured to be 0.30 cm$^3$/g while the macroporosity in pores of diameter ranging from 600 to 5,000 Angstroms was measured to be 0.04 cm$^3$/g.

In addition, a cleanly cut cross-sectional surface of a sample of the catalyst body of Example 1 was visually inspected for defects comprising inner partition wall and outer peripheral wall discontinuities. The sample was determined to have a defect level of 0.22%.

The honeycomb-like monolithic structural catalyst body of Example 1 was subsequently tested for the selective catalytic reduction of nitrogen oxides in a gas. Performance testing of the catalyst body for the selective reduction of nitrogen oxides was conducted in accordance with the VGB Guideline VGB-R 302He ("Guideline for the Testing of DENOX Catalysts"), 2$^{nd}$ revised edition (1998). The catalytic performance was measured in a microreactor at a temperature of 300° C. in a gas stream comprising 2% oxygen on a dry basis, 10% water vapor, 180 ppmv nitrogen monoxide on a dry basis, 216 ppmv ammonia on a dry basis, and balance $N_2$, following the VGB Guideline using a square subsectional piece cut from a sample of the honeycomb-like monolithic structural catalyst body such that the subsectional piece had no outer peripheral walls. The catalytic performance test was conducted at an area velocity of 22.9 normal cubic meters of gas flow per hour per square meter of geometric surface area. The geometric surface area is equal to the perimeter of the flow channels times the length of the flow channels multiplied by the number of flow channels contained within the structural catalytic body.

The honeycomb-like monolithic structural catalyst body of Example 1 demonstrated a 93.9% reduction in nitrogen oxide of the gas stream passed through the catalyst body. The calculated catalytic activity for the catalyst body was determined to be 64.0 normal cubic meters per hour per square meter as calculated according to the VGB Guideline. These results are summarized in Table 2.

TABLE 2

|  | EXAMPLE 1 |
|---|---|
| Titanium Dioxide ($TiO_2$) Content, Wt. % | 75.6 |
| Tungsten Trioxide ($WO_3$) Content, Wt. % | 8.9 |
| Vanadium Pentoxide ($V_2O_5$) Content, Wt. % | 3.4 |
| Other Components ($SiO_2$, CaO, $Al_2O_3$, $Fe_2O_3$, $SO_4$, and other minor species), Wt. % | 12.1 |
| Nominal Cross-Sectional Shape | Square |
| Outer Wall Thickness (mm) | 0.65 |
| Inner Wall Thickness (mm) | 0.27 |
| Hydraulic Diameter (mm) | 150 |
| Total Cells | 4,900 |
| Total Walls | 9,940 |
| Transverse Compression Strength (kg/cm$^2$) | 5.8 |
| Porosity, cm$^3$/g | 0.30 |
| Macroporosity (pore volume in pores of diameter ranging from 600 to 5,000 Angstroms), cm$^3$/g | 0.04 |
| Defects, % | 0.22 |
| Area Velocity in Performance Test, Nm$^3$/(hr-m$^2$) | 22.9 |
| $NO_x$ Reduction Observed in Test, % of Inlet $NO_x$ | 93.9 |
| Catalytic Activity (K) Result of Test, Nm$^3$/(hr-m$^2$) | 64.0 |

Example 2

A honeycomb-like monolithic structural catalyst body of the present invention was prepared by extrusion according to the method of described herein for producing a structural catalyst body of the present invention wherein energy loss was minimized by the use of a lubricant and die clogging was minimized by the use of a screen as described herein. The compositional parameters and physical properties of the catalytic body are summarized in Table 3. The catalytic body displayed a catalyst composition comprising 78.3% titania ($TiO_2$), 7.7% tungsten trioxide ($WO_3$), 3.5% vanadium pentoxide ($V_2O_5$), and 10.5% other comprising $SiO_2$, CaO, $Al_2O_3$, $Fe_2O_3$, $SO_4$, and minor species.

The thickness of the inner partition walls of the catalyst body was 0.21 mm while the thickness of the outer peripheral wall was 0.57 mm, the walls being measured in accordance with the twelve (12) point method previously described. The flow channels enclosed by the inner partition walls in were nominally square in cross-sectional profile. The outer perimeter of the outer periphery was nominally square in cross-sectional profile with a hydraulic diameter of 151 mm.

The honeycomb-like monolithic structural catalyst so prepared demonstrated a total of 4,900 cells comprising longitudinal flow channels and a total of 9,940 walls comprising the inner partition walls and outer peripheral wall segments.

The transverse compressive strength of the catalyst body was measured according to the method previously discussed. The catalyst body displayed a transverse compressive strength of 5.8 kg/cm$^2$. Moreover, the porosity and macroporosity of catalyst body were determined in a manner consistent with the ASTM mercury intrusion porosimetry procedure previously described for calculating these parameters. The porosity was measured to be 0.31 cm$^3$/g while the macroporosity in pores of diameter of 600-5,000 Angstroms was measured to be 0.09 cm$^3$/g.

In addition, a cleanly cut cross-sectional surface of a sample of the catalyst body was visually inspected for defects comprising inner partition and outer peripheral wall discontinuities. The sample was determined to have a defect level of 0.15%.

The honeycomb-like monolithic structural catalyst body was subsequently tested for the selective catalytic reduction of nitrogen oxides in a gas. Performance testing of the catalytic body for the selective reduction of nitrogen oxides was conducted in accordance with the VGB Guideline VGB-R 302He ("Guideline for the Testing of DENOX Catalysts"), 2$^{nd}$ revised edition (1998). The catalytic performance was measured in a microreactor at a temperature of 300° C. in a gas stream comprising 2% oxygen on a dry basis, 10% water vapor, 180 ppmv nitrogen monoxide on a dry basis, 216 ppmv ammonia on a dry basis, and balance N$_2$, following the VGB Guideline using a square subsectional piece cut from a sample of the honeycomb-like monolithic structural catalyst body such that the subsectional piece had no outer peripheral walls. The catalytic performance test was conducted at an area velocity of 25.9 normal cubic meters of gas flow per hour per square meter of geometric surface area.

The honeycomb-like monolithic structural catalyst body demonstrated a 93.9% reduction in nitrogen oxide of the gas stream passed through the catalyst body. The calculated catalytic activity for the catalyst body was determined to be 72.2 normal cubic meters per hour per square meter.

TABLE 3

|  | EXAMPLE 2 |
|---|---|
| Titanium Dioxide (TiO$_2$) Content, Wt. % | 78.3 |
| Tungsten Trioxide (WO$_3$) Content, Wt. % | 7.7 |
| Vanadium Pentoxide (V$_2$O$_5$) Content, Wt. % | 3.5 |
| Other Components (SiO$_2$, CaO, Al$_2$O$_3$, Fe$_2$O$_3$, SO$_4$, and other minor species), Wt. % | 10.5 |
| Nominal Cross-Sectional Shape | Square |
| Outer Wall Thickness (mm) | 0.57 |
| Inner Wall Thickness (mm) | 0.21 |
| Hydraulic Diameter (mm) | 151 |
| Total Cells | 4,900 |
| Total Walls | 9,940 |
| Transverse Compression Strength (kg/cm$^2$) | 5.8 |
| Porosity, cm$^3$/g | 0.31 |
| Macroporosity (pore volume in pores of diameter ranging from 600 to 5,000 Angstroms), cm$^3$/g | 0.09 |
| Defects, % | 0.15 |
| Area Velocity in Performance Test, Nm$^3$/(hr-m$^2$) | 25.9 |
| NO$_x$ Reduction Observed in Test, % of Inlet NO$_x$ | 93.9 |
| Catalytic Activity (K) Result of Test, Nm$^3$/(hr-m$^2$) | 72.2 |

Comparison of the honeycomb-like monolithic structural catalyst of Example 2 with that of Example 1 demonstrates the advantages of the thin-walled catalyst structure of the present invention. The catalyst bodies in Examples 1 and 2 display similar catalyst compositions. The inner partition walls of the honeycomb-like monolithic structural catalyst body in Example 2, however, are 0.06 mm thinner than the inner partition walls in Example 1. Moreover, although the two examples displayed similar nitrogen oxide reduction percentages, the catalyst structure of Example 2 produced catalytic activity of 72.2 Nm$^3$/(hr-m$^2$) while the catalyst structure of Example 1 produced a catalytic activity of 64.0 Nm$^3$/(hr-m$^2$). In addition, the catalyst body of Example 2 demonstrated a higher porosity, macroporosity, and a reduced defect level when compared to the catalyst body of Example 1.

Figure 5:
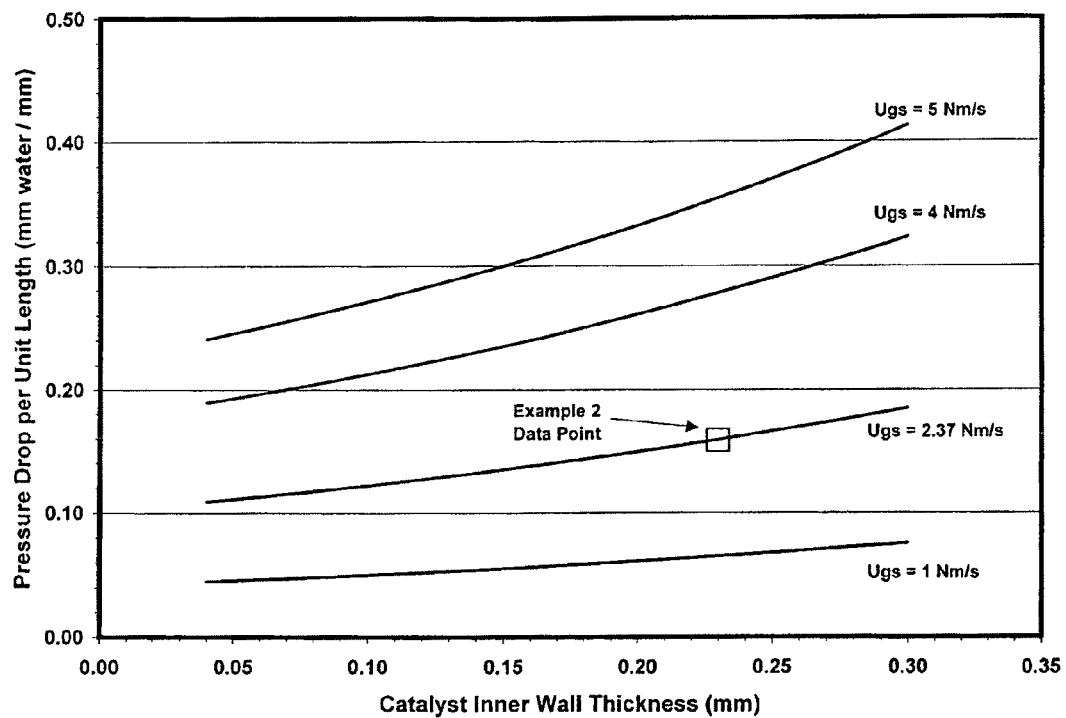
FIG. 5 illustrates the dependency of fluid pressure drop on the inner wall thickness of a catalyst body according to an embodiment of the present invention.

In addition to producing a higher catalytic activity, the thin-walled catalyst of a honeycomb-like monolithic structural catalyst body reduces the pressure drop sustained by gases when flowing through the catalytic body. The pressure drop sustained by a gas flowing through the thin-walled honeycomb-like monolithic structural catalyst body of Example 2 was measured with a slant-tube vacuum manometer across the total length of the sample under the conditions of a catalyst pitch (cell size plus inner wall thickness) of 2.15 mm, a temperature of 315° C., and a gas composition comprising 16.5% O$_2$ (dry), 5.4% water, 2.4% CO$_2$ (dry), and balance N$_2$ with a gas flow rate of 2.37 Nm/s. FIG. 5 illustrates a data point corresponding to the results of the pressure drop measurement of Example 2 plotted on theoretical curves for pressure drop per unit length of monolithic catalyst versus inner wall thickness at various gas flow rates being corrected to normal conditions of 1 atmosphere pressure and a temperature of 0° C. The data point of the catalyst body of Example 2 experimentally confirms the directly proportional relationship between sustained pressure drop per unit length experienced by a gas and inner partition wall thickness of the catalyst body.

Figure 6:
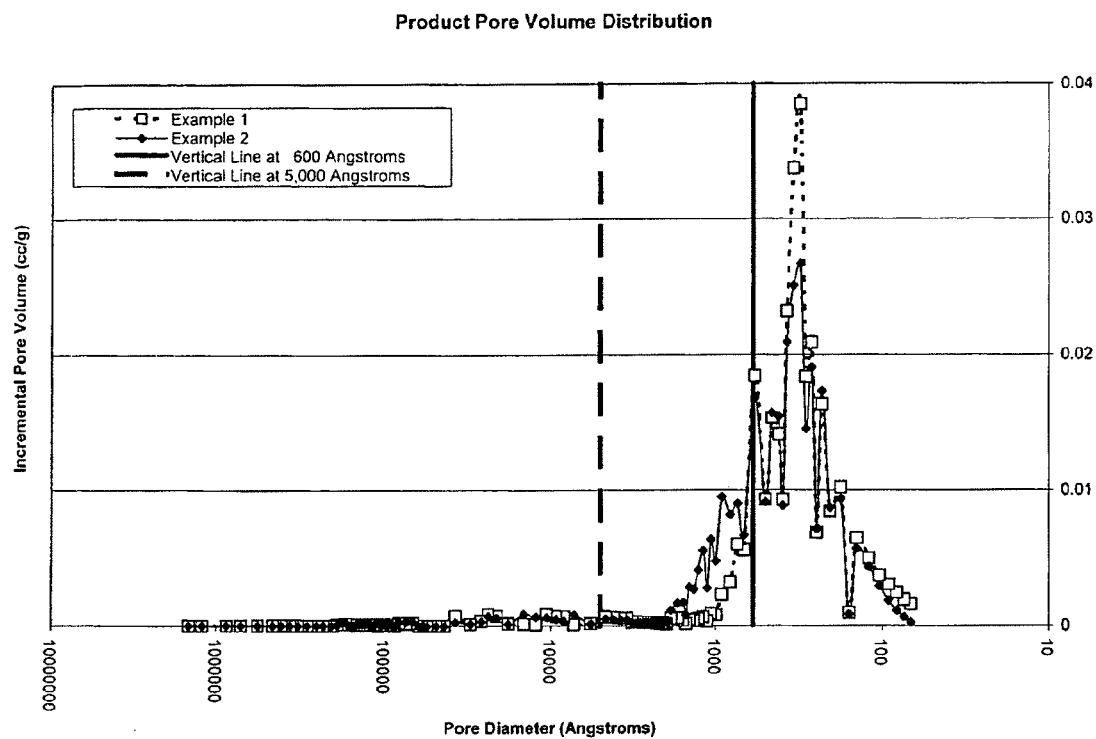
FIG. 6 illustrates the pore size distribution and incremental pore volume of a honeycomb-like monolithic structural catalyst body according to an embodiment of the present invention.

FIG. 6 illustrates the pore volume distribution of Example 2 in comparison with Example 1. The pore size distribution range for Example 2 is delineated in the plot by the solid vertical line at 600 Angstroms and the dashed vertical line at 5,000 Angstroms. As demonstrated in FIG. 6, the catalyst body of Example 2 displays a greater incremental pore volume for the pore diameter range of 600-5,000 Angstroms when compared to the catalyst body of Example 1. As a result, the catalyst body of Example 2 has a thinner inner partition wall structure and a greater macroporosity than the catalyst body of Example 1. The catalyst body of Example 2, nevertheless, retains adequate mechanical strength in light of the thinner inner partition walls and greater macroporosity. The transverse compressive strength of both Examples 1 and 2 was 5.8 kg/cm$^2$.

Figure 7:
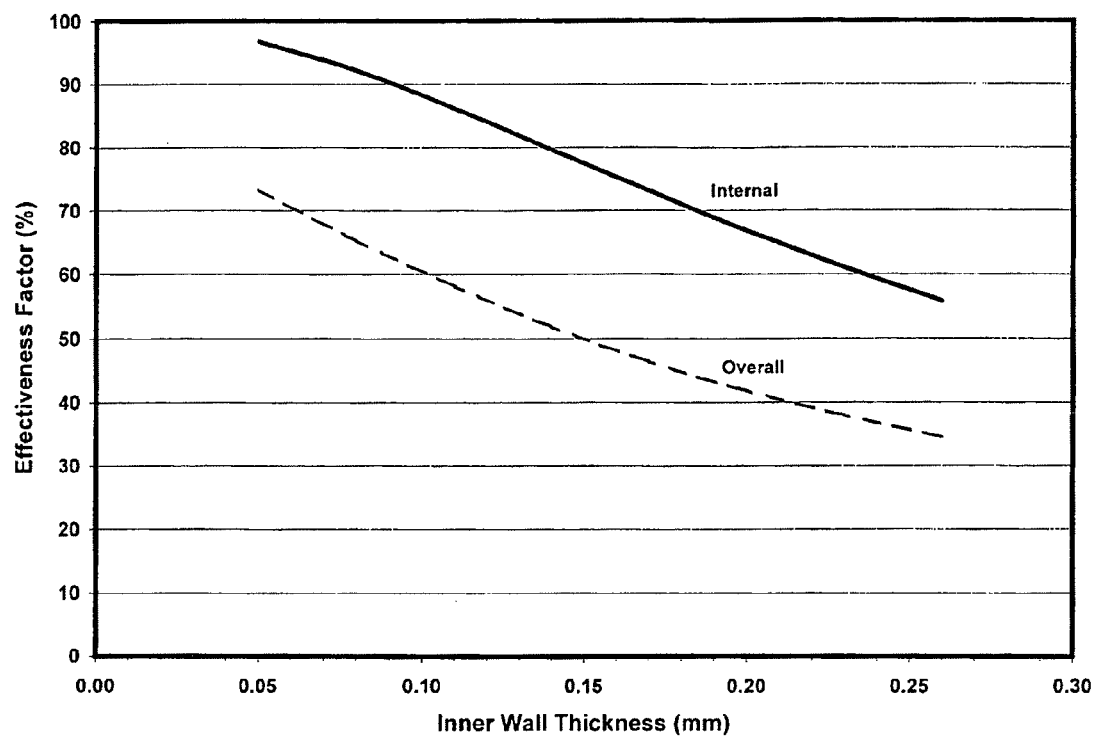
FIG. 7 illustrates the overall and internal utilizations of catalytic activity of a honeycomb-like monolithic structural body according to an embodiment of the present invention.

Furthermore, the thin-walled catalyst structure of the honeycomb-like monolithic structural catalyst body of Example 2 advantageously reduces mass transfer problems encountered by catalyst bodies with thicker inner partition walls. FIG. 7 illustrates a plot of effectiveness factor vs. inner wall thickness. FIG. 7 displays chemical engineering model estimates of the overall utilization ("Overall" curve) of the inherent catalyst activity in the structural body as limited by external or boundary-layer mass transfer and internal mass transfer within the porosity of the catalytic structural body's walls. FIG. 7 additionally displays a second curve for the "Internal" utilization of the inherent catalyst activity based on the calculated nitrogen oxide concentration at the external surface of the structural body's walls. The curves of FIG. 7 are an extrapolation of the selective catalytic reduction test conditions for the catalyst body of Example 2. As the inner wall thickness is decreased, the effectiveness factor or catalyst utilization factor increases significantly for both the Internal and Overall effectiveness. As a result of more effective utilization of catalyst composition, catalyst bodies comprising a thin-walled catalyst structure can use less catalyst to achieve similar levels of selective catalytic reduction of nitrogen oxides as displayed by catalyst bodies containing greater amounts of catalyst composition.

Example 3

A honeycomb-like monolithic structural catalyst body of the present invention was prepared by extrusion according to the method of described herein for producing a structural catalyst body of the present invention wherein energy loss was minimized by the use of a lubricant and die clogging was minimized by the use of a screen as described herein. The compositional parameters and physical properties of the catalytic body are summarized in Table 4. The catalytic body displayed a catalyst composition comprising 72.6% titania ($TiO_2$), 19.2% tungsten trioxide ($WO_3$), 0% vanadium pentoxide ($V_2O_5$), and 8.2% other components comprising $SiO_2$, $CaO$, $Al_2O_3$, $Fe_2O_3$, $SO_4$, and minor species.

The thickness of the inner partition walls of the catalyst body was 0.20 mm while the thickness of the outer peripheral wall was 0.56 mm, the walls being measured in accordance with the twelve (12) point method previously described. The flow channels enclosed by the inner partition walls and outer peripheral wall were nominally square in cross-sectional profile. The outer perimeter of the outer periphery was nominally square in cross-sectional profile with a hydraulic diameter of 151 mm.

The honeycomb-like monolithic structural catalyst so prepared demonstrated a total of 4,900 cells comprising longitudinal flow channels and a total of 9,940 walls comprising the inner partition walls and outer peripheral wall segments.

The transverse compressive strength of the catalyst body was measured according to the method previously discussed. The catalyst body displayed a transverse compressive strength of 6.2 kg/cm$^2$. Moreover, the porosity and macroporosity of catalyst body were determined in a manner consistent with the ASTM mercury intrusion porosimetry procedure previously described for calculating these parameters. The porosity was measured to be 0.31 cm$^3$/g while the macroporosity in pores of diameter of 600-5,000 Angstroms was measured to be 0.06 cm$^3$/g.

In addition, a cleanly cut cross-sectional surface of a sample of the catalyst body was visually inspected for defects comprising inner partition wall discontinuities and outer peripheral wall discontinuities. The sample was determined to have a defect level of 0.20%.

The honeycomb-like monolithic structural catalyst body was subsequently tested for the selective catalytic reduction of nitrogen oxides in a gas. Performance testing of the catalytic body for the selective reduction of nitrogen oxides was conducted in accordance with the VGB Guideline VGB-R 302He ("Guideline for the Testing of DENOX Catalysts"), 2$^{nd}$ revised edition (1998). The catalytic performance was measured in a microreactor at a temperature of 450° C. in a gas stream comprising 10.1% oxygen on a dry basis, 15% water vapor, 25 ppmv nitrogen monoxide on a dry basis, 30 ppmv ammonia on a dry basis, and balance $N_2$, following the VGB Guideline using a square subsectional piece cut from a sample of the honeycomb-like monolithic structural catalyst body such that the subsectional piece had no outer peripheral walls. The catalytic performance test was conducted at an area velocity of 14.5 normal cubic meters of gas flow per hour per square meter of geometric surface area.

The honeycomb-like monolithic structural catalyst body demonstrated a 89.2% reduction in nitrogen oxide of the gas stream passed through the catalyst body. The calculated catalytic activity for the catalyst body was determined to be 32.3 normal cubic meters per hour per square meter.

TABLE 4

|  | EXAMPLE 3 |
| --- | --- |
| Titanium Dioxide ($TiO_2$) Content, Wt. % | 72.6 |
| Tungsten Trioxide ($WO_3$) Content, Wt. % | 19.2 |
| Vanadium Pentoxide ($V_2O_5$) Content, Wt. % | 0.0 |
| Other Components ($SiO_2$, $CaO$, $Al_2O_3$, $Fe_2O_3$, $SO_4$, and other minor species), Wt. % | 8.2 |
| Nominal Cross-Sectional Shape | Square |
| Outer Wall Thickness (mm) | 0.56 |
| Inner Wall Thickness (mm) | 0.20 |
| Hydraulic Diameter (mm) | 151 |
| Total Cells | 4900 |
| Total Walls | 9940 |
| Transverse Compression Strength (kg/cm$^2$) | 6.2 |
| Porosity, cm$^3$/g | 0.31 |
| Macroporosity (pore volume in pores of diameter ranging from 600 to 5,000 Angstroms), cm$^3$/g | 0.06 |
| Defects, % | 0.20 |
| Area Velocity in Performance Test, Nm$^3$/(hr-m$^2$) | 14.5 |
| $NO_x$ Reduction Observed in Test, % of Inlet $NO_x$ | 89.2 |
| Catalytic Activity (K) Result of Test, Nm$^3$/(hr-m$^2$) | 32.3 |

Comparison of the honeycomb-like monolithic structural catalyst body of Example 3 with the catalyst bodies of Examples 1 and 2 demonstrates that the presence of vanadium pentoxide ($V_2O_5$) is not necessary to achieve the selective catalytic reduction of nitrogen oxides by catalyst bodies of the present invention. The catalyst body of Example 3 contained 0% vanadium pentoxide and displayed a nitrogen oxide reduction of 89.2%. The 19.2% tungsten trioxide ($WO_3$) content of the catalyst body of Example 3 provided the necessary catalytic activity for the selective reduction of nitrogen oxide molecules in the inlet gas stream. The catalytic activity expressed in Nm$^3$/(hr-m$^2$) of the catalyst body of Example 3 was lower than the preceding examples due to differences in the catalytic chemical composition.

Example 4

A honeycomb-like monolithic structural catalyst body of the present invention was prepared by extrusion according to the method of described herein for producing a structural catalyst body of the present invention wherein energy loss was minimized by the use of a lubricant and die clogging was minimized by the use of a screen as described herein. The compositional parameters and physical properties of the catalytic body are summarized in Table 5. The catalytic body displayed a catalyst composition comprising 79.5% titania ($TiO_2$), 10.0% tungsten trioxide ($WO_3$), 1.8% vanadium pentoxide ($V_2O_5$), and 8.7% other components comprising $SiO_2$, $CaO$, $Al_2O_3$, $Fe_2O_3$, $SO_4$, and minor species.

The thickness of the inner partition walls of the catalyst body was 0.20 mm while the thickness of the outer peripheral wall was 1.20 mm, the walls being measured in accordance with the twelve (12) point method previously described. The flow channels enclosed by the inner partition walls and outer peripheral wall were nominally square in a cross-sectional profile. The outer perimeter of the outer periphery was nominally square in cross-sectional profile with a hydraulic diameter of 147 mm inches.

The honeycomb-like monolithic structural catalyst so prepared demonstrated a total of 13,456 cells comprising longitudinal flow channels and a total of 27,144 walls comprising the inner partition walls and outer peripheral wall segments.

The transverse compressive strength of the catalyst body was measured according to the method previously discussed.

The catalyst body displayed a transverse compressive strength of 6.1 kg/cm². Moreover, the porosity and macroporosity of catalyst body were determined in a manner consistent with the ASTM mercury intrusion porosimetry procedure previously described for calculating these parameters. The porosity was measured to be 0.34 cm³/g while the macroporosity in pores of diameter of 600-5000 Angstroms was measured to be 0.05 cm³/g.

In addition, a cleanly cut cross-sectional surface of a sample of the catalyst body was visually inspected for defects comprising inner partition wall discontinuities and outer peripheral wall discontinuities. The sample was determined to have a defect level of 0.28%.

The honeycomb-like monolithic structural catalyst body of Example 4 was not performance tested for selective catalytic reduction of nitrogen oxides in a gas stream.

TABLE 5

|  | EXAMPLE 4 |
|---|---|
| Titanium Dioxide (TiO₂) Content, Wt. % | 79.5 |
| Tungsten Trioxide (WO₃) Content, Wt. % | 10.0 |
| Vanadium Pentoxide (V₂O₅) Content, Wt. % | 1.8 |
| Other Components (SiO₂, CaO, Al₂O₃, Fe₂O₃, SO₄, and other minor species), Wt. % | 8.7 |
| Nominal Cross-Sectional Shape | Square |
| Outer Wall Thickness (mm) | 1.20 |
| Inner Wall Thickness (mm) | 0.20 |
| Hydraulic Diameter (mm) | 147 |
| Total Cells | 13,456 |
| Total Walls | 27,144 |
| Transverse Compression Strength (kg/cm²) | 6.1 |
| Porosity, cm³/g | 0.34 |
| Macroporosity (pore volume in pores of diameter ranging from 600 to 5,000 Angstroms), cm³/g | 0.05 |
| Defects, % | 0.28 |
| Area Velocity in Performance Test, Nm³/(hr-m²) | — |
| NO$_x$ Reduction Observed in Test, % of Inlet NO$_x$ | — |
| Catalytic Activity (K) Result of Test, Nm³/(hr-m²) | — |

The honeycomb-like monolithic structural catalyst body of Example 4 demonstrates the advantages of a thin-walled catalyst structure in the production of a catalyst body exhibiting a large surface area. Thin catalytic walls allow for the placement of a greater number of inner partition walls within the outer peripheral wall of the catalyst body without disrupting efficient gas flow characteristics through the catalyst body. The thin-walled catalyst structure of Example 4 produced a total cell count of 13,456 and a total wall count of 27,144. The cell and wall counts of Example 4 are significantly greater than 4,900 cell count and 9,940 wall count of Example 1. The increased wall and cell counts of Example 4 produce approximately 50% greater geometric surface area per unit bulk volume while maintaining efficient gas flow characteristics through the catalytic body.

It is to be understood that the foregoing description and specific embodiments are merely illustrative of the best mode of the invention and the principles thereof, and that various modifications and additions may be made to the apparatus by those skilled in the art, without departing from the spirit and scope of this invention

The invention claimed is:

1. A monolithic structural catalyst body comprising: an outer peripheral wall and a plurality of inner partition walls having an average thickness of less than 0.22 mm, the outer peripheral wall and the plurality of inner partition walls formed of a screened and extruded chemical composition comprising 50-99.9% by weight an inorganic oxide composition and at least 0.1% by weight a catalytically active metal functional group and one or more reinforcing agents, wherein the monolithic structural catalyst body has a hydraulic diameter greater than or equal to 100 mm, and a transverse compressive strength of at least 1.5 kg/cm².

2. The monolithic structural catalyst body of claim 1, wherein the one or more reinforcing agents comprise glass fibers, silicon carbide fibers or mixtures thereof.

3. The monolithic structural catalyst body of claim 1, wherein the average thickness of the inner partition walls ranges from 0.05 mm to 0.20 mm.

4. The monolithic structural catalyst body of claim 1, wherein the average thickness of the inner partition walls ranges from 0.10 mm to 0.18 mm.

5. The monolithic structural catalyst body of claim 1, wherein the hydraulic diameter is greater than or equal to 150 mm.

6. The monolithic structural catalyst body of claim 1, wherein the transverse compressive strength is greater than 3 kg/cm².

7. The monolithic structural catalyst body of claim 1, wherein the transverse compressive strength is greater than 4 kg/cm².

8. The monolithic structural catalyst body of claim 1, wherein the monolithic structural catalyst body has a defect level of 2% or less.

9. The monolithic structural catalyst body of claim 1, wherein the monolithic structural catalyst body has a defect level of 0.3% or less.

10. The monolithic structural catalyst body of claim 1 further comprising additional catalytic material deposited on an inner partition wall.

11. The monolithic structural catalyst body of claim 1 further comprising additional catalytic material deposited on the outer peripheral wall.

12. The monolithic structural catalyst body of claim 1 further comprising additional catalytic material deposited on an inner partition wall and the outer peripheral wall.

13. A method of reducing the nitrogen dioxide content of a fluid comprising: flowing the fluid through a monolithic structural catalyst body comprising an outer peripheral wall and a plurality of inner partition walls having an average thickness of less than 0.22 mm, the outer peripheral wall and the plurality of inner partition walls formed of a screened and extruded chemical composition comprising 50-99.9% by weight an inorganic oxide composition and at least 0.1% by weight a catalytically active metal functional group and one or more reinforcing agents, wherein the monolithic structural catalyst body has a hydraulic diameter greater than or equal to 100 mm, and a transverse compressive strength of at least 1.5 kg/cm².

14. The method of claim 13, wherein the one or more reinforcing agents comprise glass fibers, silicon carbide fibers or mixtures thereof.

15. The method of claim 13, wherein the average thickness of the inner partition walls ranges from 0.05 mm to 0.20 mm.

16. The method of claim 13, wherein the average thickness of the inner partition walls ranges from 0.10 mm to 0.18 mm.

17. The method of claim 13, wherein the hydraulic diameter is greater than or equal to 150 mm.

18. The method of claim 13, wherein the transverse compressive strength is greater than 3 kg/cm².

19. The method of claim 13, wherein the transverse compressive strength is greater than 4 kg/cm².

20. The method of claim 13 further comprising additional catalytic material deposited on an inner partition wall.

21. The method of claim 13 further comprising additional catalytic material deposited on the outer peripheral wall.

22. The method of claim 13, wherein the fluid comprises a combustion-flue gas.

23. The method of claim 22, wherein the temperature of the combustion flue gas ranges from 150° C. to 600° C.

* * * * *